J. Butts,

Nose Ring,

Nº 67,952. Patented Aug. 20, 1867.

Witnesses:
Theo Tusche
W. Treurw

Inventor:
J. Butts
Per Munn & Co.
Attorneys

United States Patent Office.

JOHN BUTTS, OF EVANSVILLE, WISCONSIN.

Letters Patent No. 67,952, dated August 20, 1867.

IMPROVEMENT IN ATTACHMENT FOR PREVENTING HOGS FROM ROOTING.

*The Schedule referred to in these Letters Patent and making part of the same.*

TO ALL WHOM IT MAY CONCERN:

Be it known that I, JOHN BUTTS, of Evansville, in the county of Rock, and State of Wisconsin, have invented a new and improved Attachment to Prevent Hogs from Rooting; and I do hereby declare that the following is a full, clear, and exact description thereof, which will enable those skilled in the art to make and use the same, reference being had to the accompanying drawings, forming part of this specification.

The present invention relates to an attachment to the snout of hogs for the purpose of preventing them from rooting. In the accompanying plate of drawings, my improved attachment is illustrated—

Figure 1:
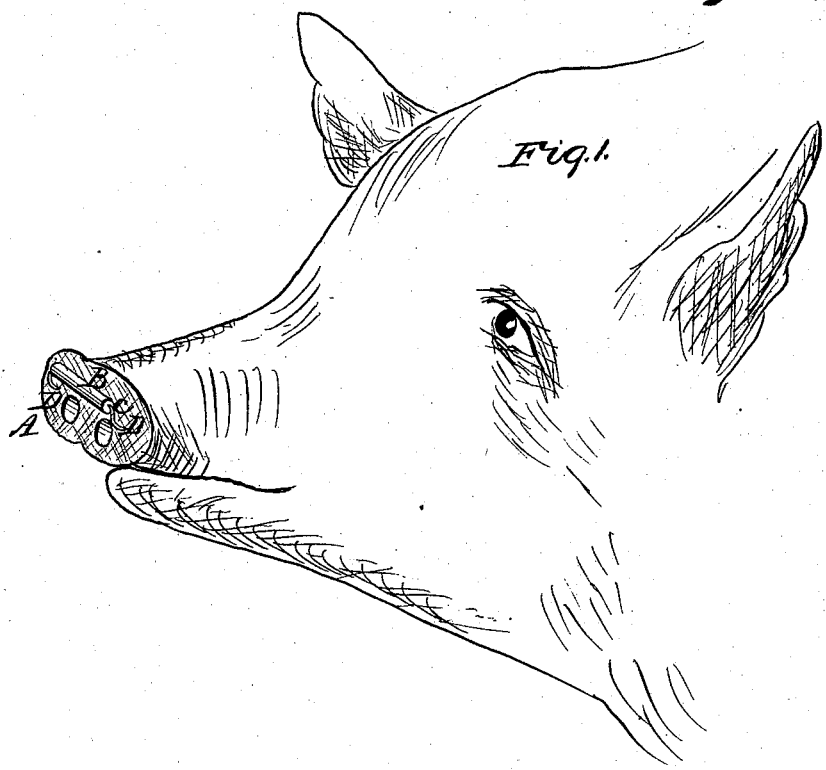

Figure 1 being a view of the same as applied to the snout of a hog, and

Figure 2:

Figure 2 a cross-section through the attachment.

Similar letters of reference indicate corresponding parts.

A, in the drawings, represents my improved attachment, which consists of a roller, B, hung upon a centre spindle or shaft, C, that at each end projects therefrom, and is bent at right angles, with the points sharpened, or sufficiently so, to enable them to be readily inserted in and passed through the upper lip to the snout of a hog, where, by bending them over, the attachment is fastened. By the roller B the hog is prevented from rooting, as such roller, when the hog attempts so to do, slides along and over the ground.

*Claim.*

I claim as new, and desire to secure by Letters Patent—

The roller attachment A, substantially as and for the purpose described.

JOHN BUTTS.

Witnesses:
 DAVID L. MILLS,
 J. A. FREEMAN.